(12) United States Patent
Huang et al.

(10) Patent No.: US 10,616,625 B2
(45) Date of Patent: Apr. 7, 2020

(54) REINFORCEMENT LEARNING NETWORK FOR RECOMMENDATION SYSTEM IN VIDEO DELIVERY SYSTEM

(71) Applicant: HULU, LLC, Santa Monica, CA (US)

(72) Inventors: Siguang Huang, Beijing (CN); Guoxin Zhang, Beijing (CN); Hanning Zhou, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/985,473

(22) Filed: May 21, 2018

(65) Prior Publication Data

US 2019/0356937 A1 Nov. 21, 2019

(51) Int. Cl.
*H04N 21/45* (2011.01)
*H04N 21/472* (2011.01)
*H04N 21/25* (2011.01)

(52) U.S. Cl.
CPC ....... *H04N 21/251* (2013.01); *H04N 21/4532* (2013.01); *H04N 21/472* (2013.01)

(58) Field of Classification Search
CPC . H04N 21/251; H04N 21/4532; H04N 21/472
USPC ........................................................... 725/9
See application file for complete search history.

(56) References Cited

U.S. PATENT DOCUMENTS

| 2003/0182249 | A1* | 9/2003 | Buczak | H04N 7/16 706/15 |
| 2015/0039608 | A1* | 2/2015 | Basilico | G06F 16/735 707/734 |
| 2017/0105048 | A1* | 4/2017 | Stein | H04N 21/4826 |
| 2018/0027295 | A1* | 1/2018 | Lee | H04N 21/422 |
| 2018/0152763 | A1* | 5/2018 | Barlaskar | G06Q 30/0255 |

OTHER PUBLICATIONS

Thorat et al.: "Hybrid Conversational Recommender System Using Q-Learning"; IJACKD Journal of Research; vol. 4; Issue 1; Feb. 2016; 5 pages.

* cited by examiner

*Primary Examiner* — Nasser M Goodarzi
*Assistant Examiner* — Jaycee Imperial
(74) *Attorney, Agent, or Firm* — Fountainhead Law Group, PC

(57) ABSTRACT

A method receives user behavior information at a first system. The user behavior information is determined by user interaction with a first list sent to the user by a first network on a video delivery service. A first state is generated using the received user behavior information and prior user behavior information by the user from cells that store the prior user behavior. The method inputs the first state into a second network with the first recommendation list to generate a value that evaluates a performance of recommending the first recommendation list. An update to parameters is generated for the first network and provided to the first network. The first network generates a second state from the received user behavior information and prior user behavior information derived from cells that store the prior user behavior and outputs a second recommendation list using the second state and updated parameters.

20 Claims, 7 Drawing Sheets

REINFORCEMENT LEARNING NETWORK FOR RECOMMENDATION SYSTEM IN VIDEO DELIVERY SYSTEM

BACKGROUND

In a video delivery service, providing relevant recommendations to a user may increase the use frequency of the service. The video delivery service may use a recommendation algorithm that is based on static patterns learned from user history data. However, user preferences and behaviors often change over time. To capture these changes, the video delivery service may periodically update the static patterns for the recommendation algorithm. Oftentimes, these updates are not frequent enough to keep up with the changing user preferences. Additionally, when offering an interactive live television service in addition to video on-demand, user preferences may change even more often. Further, the complexity of generating recommendations may increase due to the difference in viewing habits for the live television service and the video on-demand service. Thus, the use of static patterns may not be able to generate relevant recommendations for users using both services.

DETAILED DESCRIPTION

Described herein are techniques for a recommendation system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A recommendation system uses a recommendation learning model to adapt to a user's changing preference or behavior in real-time. The learning model may use two systems to quickly respond to user interest changes by the user selecting different recommendations or be other interactions with a video delivery service, such as by playing different videos. The learning model constantly learns from the interaction of users with the video delivery service. One system may generate a recommendation list and a second system may evaluate those recommendation lists. Then, when users access the video delivery service, such as to select recommendations from recommendation lists, the second system may evaluate the recommendation lists generated from the first system. From the evaluation, the second system may update parameters that are used to generate the recommendation lists in the first system. This process may be ongoing while the user interacts with the video delivery service. For example, after every action by a user on the video delivery service (e.g., selecting recommendations, watching videos, etc.), the second system may evaluate the recommendation lists provided by the first system and update the parameters used to generate recommendation lists in the first system. This ensures that relevant recommendations in the recommendation lists are provided to a user.

The first system and second system include features that allow the two systems to adapt to the changing user behavior in real-time. For example, the first system and second system use a memory structure, such as recurrent cells, that can remember the previous user behavior when generating recommendation lists. Further, because the video delivery service is generating recommendation lists in a large item space (e.g., an entire video library)—that is, the possible videos that can be selected are very large instead of a set action space—the first system may use a continuous embedding space that defines videos as vectors based on the video's characteristics. These features allow the recommendation system to provide more relevant recommendation lists. Also, the two systems allow the recommendation system to adapt to the changing user behavior in real-time while operating with the video delivery service. Using two systems allows for the evaluation and adjustment of the first system while allowing the first system to remain operational during a user's interaction with the recommendation system.

System

Figure 1:
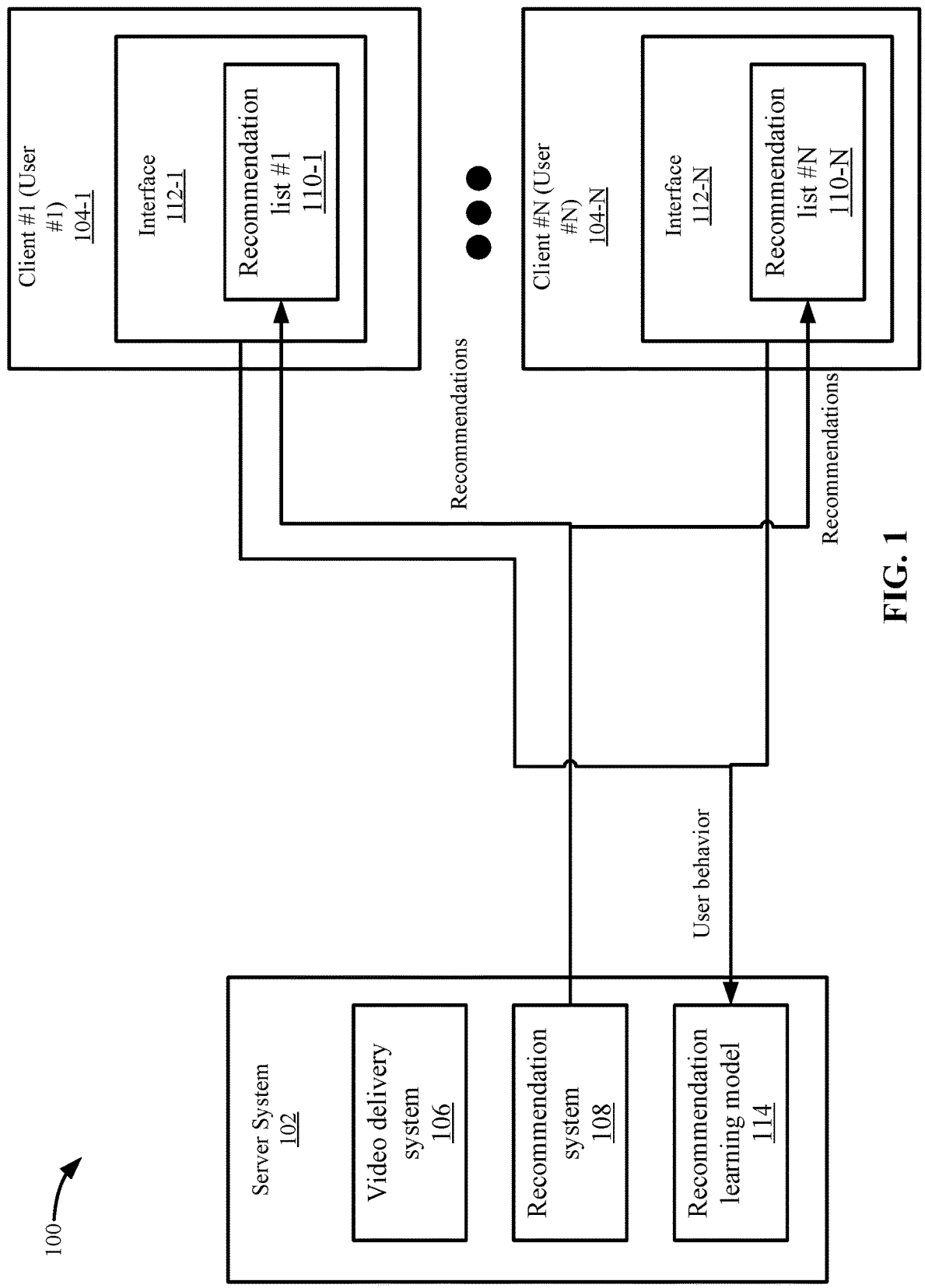
FIG. 1 depicts a simplified system of a method for providing recommendations according to some embodiments.

FIG. 1 depicts a simplified system 100 of a method for providing recommendation lists 110-1 to 110-N according to some embodiments. A server system 102 generates recommendation lists 110 for client devices 104-1 to 104-N. Different users may use different client devices and server system 102 generates personalized recommendation lists 110 for each user. A recommendation list 110 may include one or more recommendations.

Server system 102 includes a video delivery system 106 that can deliver videos to clients 104. While interacting with a video delivery service, video delivery system 106 may record user behavior. User behavior may include different actions taken by the user, such as what videos the user watches, what recommendations the user selects, and other actions taken while using the video delivery service. User behavior may also include implicit and explicit feedback from users. Explicit feedback may include which videos the user has selected. Implicit feedback may be implied from user actions on the service, such as videos the user did not select.

Recommendation system 108 generates recommendation lists 110 for users. For example, recommendation system 108 may generate a recommendation list 110 that may be displayed on an interface 112. Client device #1 may include an interface 112-1 that displays a recommendation list #110-1 that is personalized for user #1 and interface 112-N may display a recommendation list #110-N that is personalized for user # N. Recommendation lists 110-1 to 110-N may be displayed at various times. For example, when a user displays interface 112, a recommendation list may be displayed to give the user options to select which video to watch. In some examples, a home screen of interface 112 may list categories that are populated with videos from the recommendation list 110. In other examples, when a user is finishing a video, recommendation new recommendation list 110 for a next video to watch may be displayed.

Recommendation system 108 may use a recommendation learning model 114 to adapt to changing user preferences in real-time. When a user interacts with recommendation list 110, interface 112 sends user behavior back to server system 102. Recommendation learning model 114 analyzes the user behavior to adapt the model used to generate recommendation lists 110 for recommendation system 108. As will be discussed in more detail below, recommendation learning model 114 uses two systems to generate the recommendation lists 110, a generation system and an evaluation system. The generation system generates the recommendation lists 110 and the evaluation system evaluates the recommendation lists 110. Based on the evaluation, the evaluation system can update parameters used by the generation system to generate the recommendation lists 110. The structure of the two systems allows recommendation system 108 to adapt to changing user preferences in real-time while a user is interacting with interface 112. For example, while a user is scrolling through user interface 112 and selecting categories to display or videos to watch, recommendation learning model 114 may analyze the user behavior and adjust which videos are recommended on user interface 112.

The implementation of the two systems allows recommendation lists 110 to be generated and evaluated at the same time. This improves the efficiency of recommendation system 108 by having the evaluation performed by the evaluation system while still allowing recommendation system 108 to generate recommendation lists 110 in interface 112. The use of real-time learning from user behavior may increase the relevance of the recommendation lists 110, which may lead to an increase in user satisfaction with the overall video delivery service. Also, the recommendation lists 110 generated by recommendation system 108 may not become stale in contrast to the static algorithm used as described in the Background.

Recommendation Learning Model

Figure 2:
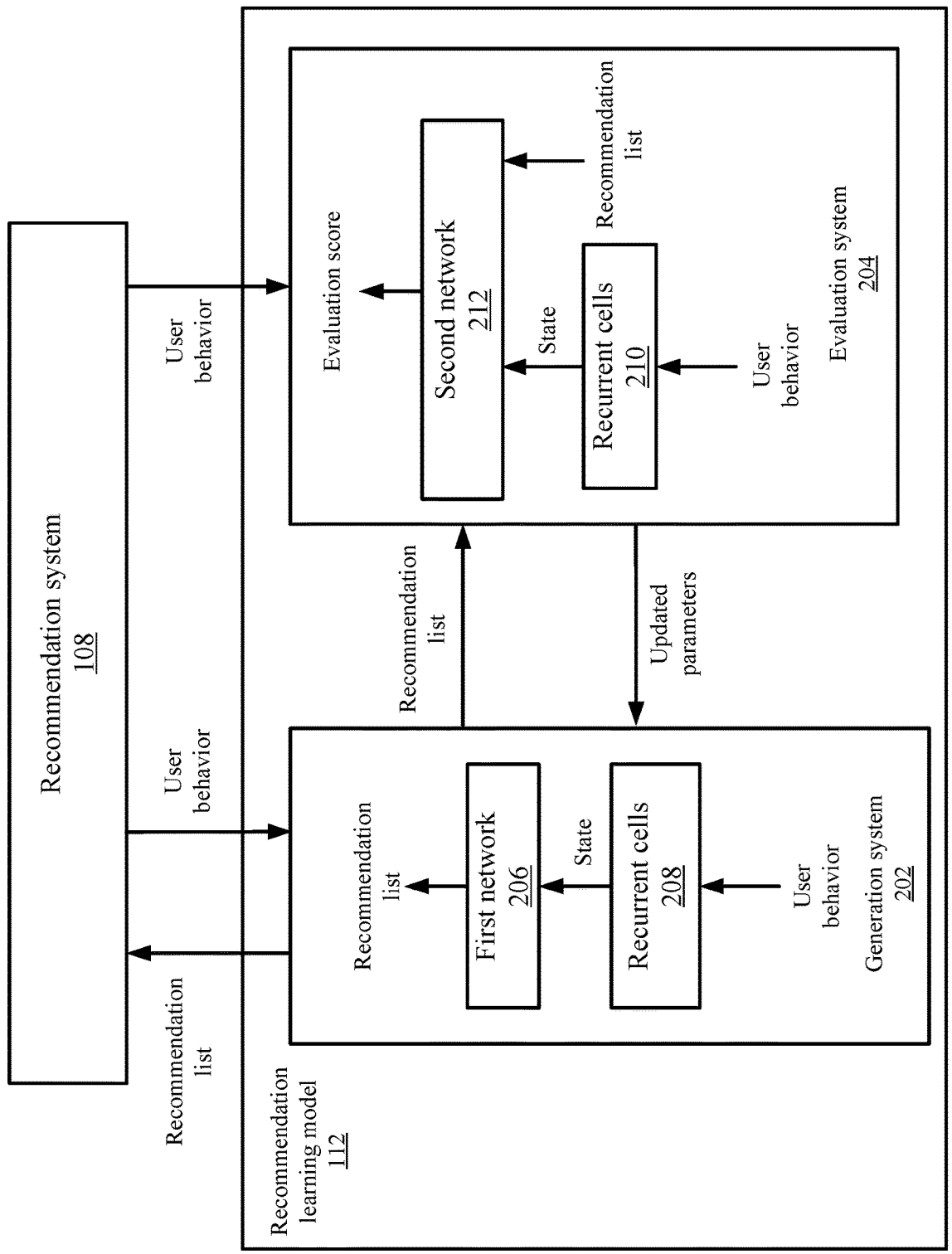
FIG. 2 depicts a more detailed example of a recommendation learning model according to some embodiments.

FIG. 2 depicts a more detailed example of recommendation learning model 114 according to some embodiments. Recommendation learning model 114 includes a generation system 202 and an evaluation system 204. Generation system 202 generates a recommendation list for recommendation system 108. Recommendation system 108 can then provide the recommendation list 110 to clients 104. Users interact with the recommendation list 110 and interface 112 records user behavior and sends the user behavior to recommendation system 108. The user behavior may include any actions taken by the user, such as selecting one of the recommended videos. For example, a user may select a video to play from the recommendation list 110. Recommendation system 108 then sends the user behavior to generation system 202 and evaluation system 204.

Evaluation system 204 uses the user behavior to evaluate the recommendation list provided by generation system 202. From the evaluation, evaluation system 204 may then update the parameters being used by generation system 202 to generate the recommendation list 110. Using the updated parameters, generation system 202 may then generate another recommendation list 110.

In some embodiments, generation system 202 and evaluation system 204 may operate in parallel with a user using the video delivery service and interacting with recommendation system 108. While a user is selecting a video from the recommendation list 110, generation system 202 may be sending a recommendation list to evaluation system 204 for evaluation. Then, evaluation system 204 may send updated parameters to generation system 202 upon evaluating the recommendation list 110 using the latest user behavior. Generation system 202 may use the updated parameters to generate another recommendation list 110 that is sent to evaluation system 204, but not the user. Evaluation system 204 evaluates the recommendation list 110 with the existing user behavior. If needed, evaluation system 204 generates new parameters and sends the parameters to generation system 202 again. This process may continuation until the parameters do not need to be updated anymore (or the user performs some action to change the user behavior). The evaluation process in the background keeps generation system 202 updated with the latest user preferences and also the most relevant parameters.

Generation system 202 may include multiple features that are used to enable providing recommendation lists 110 using the real-time evaluation. For example, the item space of possible recommendations may be very large given the number of videos being offered by the video delivery service. Generation system 202 may convert the item space into a continuous embedding space. The use of the continuous embedding space allows the recommendation generation complexity to be de-coupled from the scale of the discrete action space. That is, the possible number of videos that could be recommended makes the number of possible recommendations very large. The complexity of a network configured to select one of those videos may be very high. Using the continuous embedding space allows the first network to output an action within the space without having to figure out an exact video. The continuous embedding space may describe videos based on their characteristics, such as via a vector. This allows generation system 202 to generate a vector with characteristics, and then generation system 202 can select videos with vectors that are similar to the output vector. For example, generation system 202 may use a K-nearest-neighbor algorithm to generate the recommendation list 110 according to a similarity of the action generated by generation system 202 and the vectors in the embedding space. Using the continuous embedding space allows generation system 202 to determine the recommendation lists 110 faster because an exact match of an identifier for a video is not needed. When using the item space, generation system 202 would need to determine an item based on the inputs. However, determining the item is a computationally intensive operation. Determining the vector without determining an item is a faster operation. Also, when a new item is added to the video delivery service, the learning model does not need to be changed. Rather, the embedding for the new video can be added to the embedding space.

Also, generation system 202 and evaluation system 204 use recurrent cells 208 and recurrent cells 210, respectively, to keep track of sequential user behavior. The user's behavior is treated as sequential data to capture the dependent nature of the user behavior on recommendation lists 110. Sequential user behavior may represent the sequential actions in the user behavior. This may provide better recommendation lists 110 as the sequential nature of user behavior may be important to understanding the change in user preference based on user behavior. In order to make the recurrent cells work more efficiently for the reinforcement learning scenarios, the output of the recurrent cells is set as a vector in the continuous video embedding space. This is different from where the output is a discrete video identifier.

In generation system 202, user behavior is input into recurrent cells 208 that keep track of sequential user behavior, such as which videos the user has previously selected. Recurrent cells 208 then output a state, which represents the sequential user behavior. For example, when a new user behavior is received, recurrent cells 208 may add the user behavior and generate a new state which represents the sequential status of the user behavior.

First network 206 may be a prediction network, such as a neural network, that can output an action in the continuous embedding space. The action may be a vector in the continuous embedding space that describes characteristics of an item. Although a continuous embedding space is described, it will be understood that first network 206 may also output an identifier for an item. For example, first network 206 may output identifiers for items directly. However, given the real-time environment, first network 206 uses the continuous embedding space to generate the recommendation lists 110 faster and in a time required to generate interface 112. For example, the determination of an item that matches a state may be a longer computational process than determining a vector in the continuous embedding space. The action in the continuous embedding space may not exactly match the vector associated with an item in the embedding space; however, generation system 202 can determine N items that have vectors that are closest to the action output by first network 206. The top N items may then be output as the recommendation list to recommendation system 108. One reason the top N items may be used is that the recommendation list can be generated using items that are close to the action and do not need to exactly match the action.

When a user performs some action on interface 112, such as selecting a video, user behavior information is sent to generation system 202 and evaluation system 204. The user behavior is input into recurrent cells 208 and recurrent cells 210, respectively, to update the sequential data being stored by recurrent cells 208 and 210. Recurrent cells 210 can then output a state based on the new user behavior being integrated with the prior user behavior. Also, evaluation system 204 may input the recommendation list that was generated by generation system 202 into second network 212.

Second network 212 is then configured to generate an evaluation score, such as a Q score, that measures the relevance of the recommendation list 110. For example, a higher evaluation score means that the recommendation list 110 generated by generation system 202 is more relevant to the user. A lower score means that the recommendation list 110 generated by generation system 202 is not as relevant to the user. Second network 212 generates a predicted the evaluation score Q, by learning a regression function from the actual Q scores calculated using the previously observed user behaviors and recommendation lists 110 generated by first network 202.

Based on the Q score estimated by the evaluation system 204, first network 206 updates the parameters used by first network 206. In some embodiments, the Q score provided by the evaluation system 204 is used to calculate a policy gradient, which is then used to update the parameters. The gradient defines how to update the parameter values.

When generation system 202 receives the updated parameters, generation system 202 then updates the parameters, such as the weights between nodes in the prediction network, used by first network 206 to generate recommendation lists 110. With different weights, first network 206 may generate different actions. Once the parameters of first network 206 are updated, generation system 202 may generate another recommendation list 110 without being prompted by interface 112. For example, the recommendation list 110 is not used to display recommendation lists 110 to the user, but rather to further evaluate the performance of generation system 202. In this example, generation system 202 inputs the latest user behavior into recurrent cells 208, which generates a state that is input into first network 206. Then, first network 206 generates the recommendation list 110 as described above by generating an action in the continuous embedding space. Generation system 202 then selects the top N items closest to the action and sends the recommendation list 110 to evaluation system 204. Evaluation system 204 may then evaluate the recommendation list 110 again using the existing user behavior state. This second loop may be continuously performed even while a user is not interacting with interface 112 to generate new user behavior until the gradient change is minimized meaning the parameters cannot be updated anymore. The second loop refines generation system 202 to generate better recommendation lists without having a user interact with interface 112.

Accordingly, evaluation system 204 can evaluate the recommendation list 110 generated by first network 206 on a continuous basis. For example, evaluation system 204 may evaluate the recommendation list 110 output to interface 112 in a first loop. Further, when updated parameters are generated, generation system 202 and evaluation system 204 may interact to improve the recommendation lists 110 being generated without providing the recommendation lists 110 to users in a second loop.

Recommendation Generation

Figure 3:
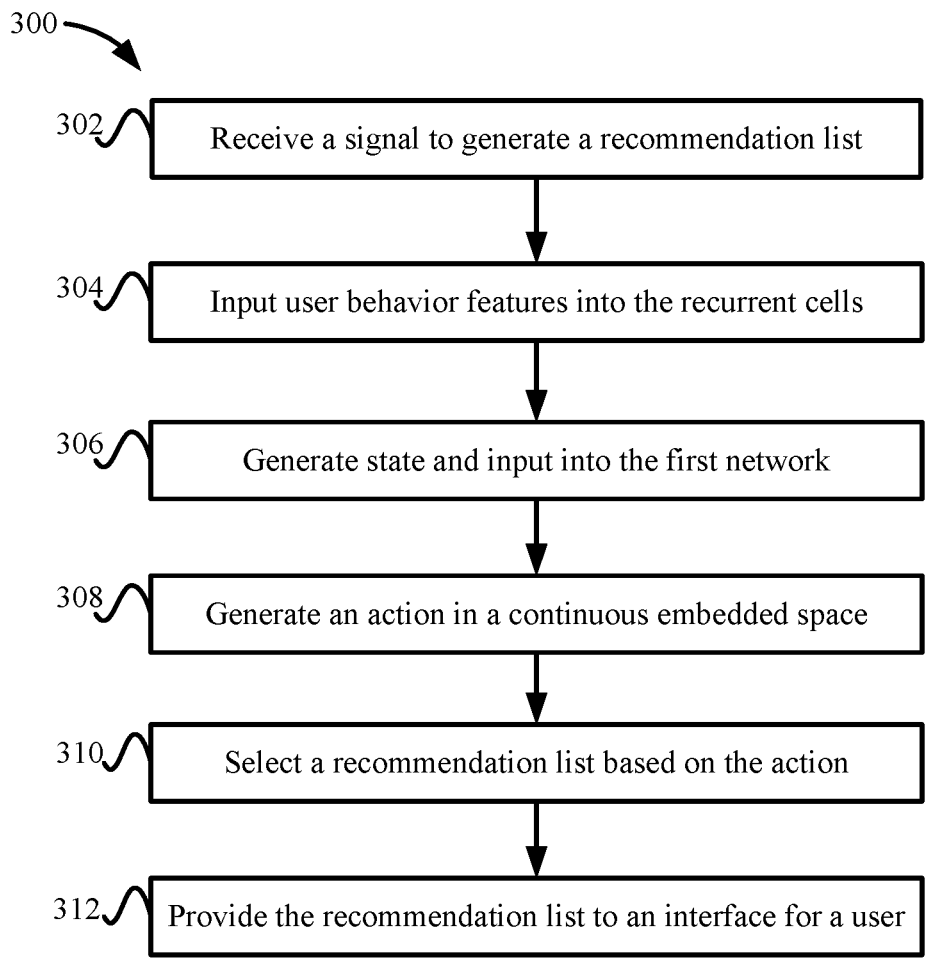
FIG. 3 depicts a simplified flowchart of a method for generating recommendations using a generation system according to some embodiments.

FIG. 3 depicts a simplified flowchart 300 of a method for generating recommendation lists 110 using generation system 202 according to some embodiments. At 302, generation system 202 receives a signal to generate recommendation list 110. For example, interface 112 may send a signal to video delivery system 106 to display interface 112. Video delivery system 106 may then send a signal to recommendation system 108 to generate recommendation list 110.

At 304, generation system 202 inputs user behavior features into recurrent cells 208. Recurrent cells 208 store the previous user behavior and can add the user behavior to the previous user behavior sequentially. At 306, recurrent cells 208 generate a state that is input into first network 206.

At 308, first network 206 generates an action in the continuous embedding space. For example, the action may be a vector that includes characteristics for videos.

The action may include characteristics that may or may not match the characteristics of other videos exactly. However, given the continuous embedding space, generation system 202 may determine videos that include characteristics that are similar to the action. At 310, generation system 202 selects a recommendations list 110 based on the action. For example, N videos that include characteristics that are closest to the characteristics of the action may be selected.

At 312, generation system 202 provides the recommendation list 110 to recommendation system 108, which then provides recommendation list 110 to interface 112 for a user. For example, interface 112 may display a list of videos that are recommended for a user.

Evaluation System

Figure 4:
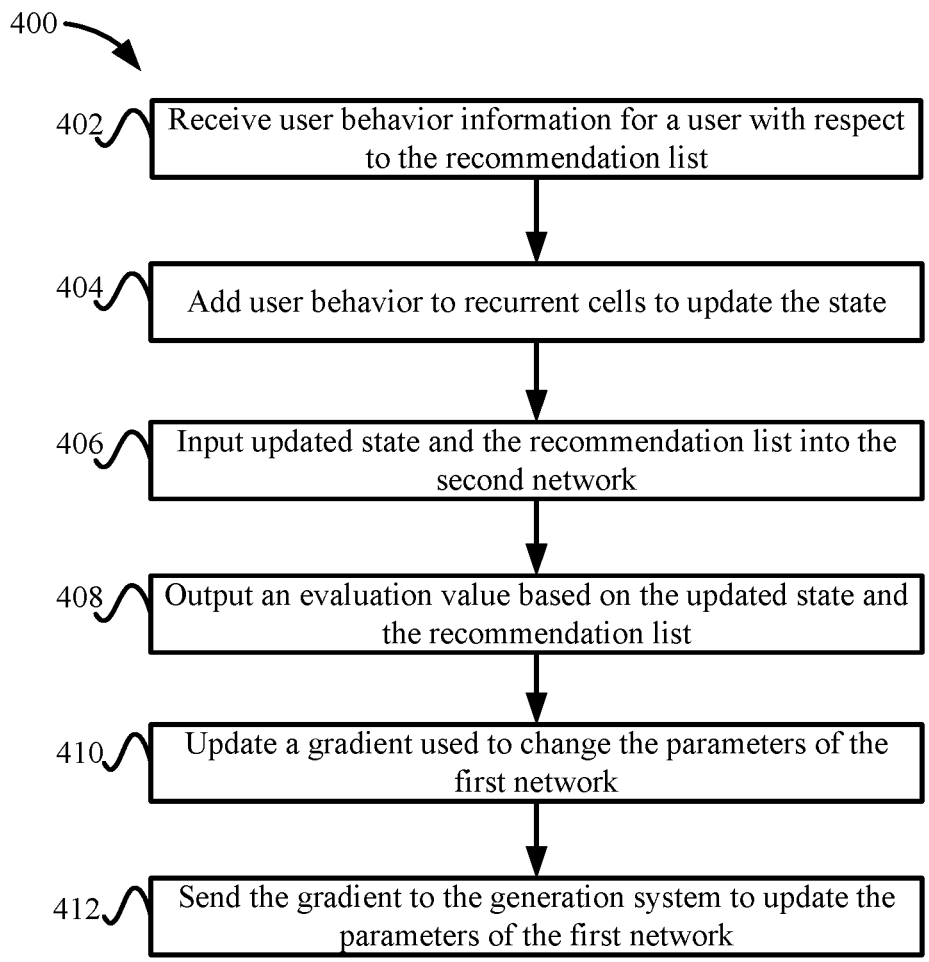
FIG. 4 depicts a simplified flowchart of a method for processing user behavior associated with the list of recommendations according to some embodiments.

Interface 112 can display the recommendation lists 110 and a user can interact with interface 112. FIG. 4 depicts a simplified flowchart 400 of a method for processing user behavior associated with the recommendation lists 110 according to some embodiments. At 402, evaluation system 204 receives user behavior information for a user with respect to the recommendation list 110. This may include explicit and implicit user actions taken with the recommendation list 110.

At 404, evaluation system 204 adds the user behavior to recurrent cells 210 to update the state. For example, the new user behavior may be added as sequential data in recurrent cells 210.

At 406, evaluation system 204 inputs the updated state from recurrent cells 210 into second network 212. Also, the recommendation list 110 generated by generation system 202 is input into second network 212.

At 408, second network 212 outputs an evaluation value based on the updated state and the list of recommendations. The evaluation value may evaluate the relevancy of the recommendation list 110 based on the updated state.

At 410, evaluation system 204 updates the gradient used to change the parameters of the first network. Then, at 412, evaluation system 204 sends the gradient to generation system 202 to update the parameters of the first network.

Generation system 202 may then generate another recommendation list 110 using the updated parameters and send the recommendation list back to evaluation system 204 for evaluation. If any parameters need to be updated, evaluation system 204 sends the updated parameters back to generation system 202.

Training

The use of recommendation system 108 is used in a live environment. However, given the use of the learning model, the performance of recommendation learning model 114 in an early stage for a user may be very poor if not pre-trained. Accordingly, some embodiments pre-train recommendation learning model 114 to initialize parameters of first network 206 and second network 212 to provide a starting point that provides relevant recommendation lists 110 from the beginning.

Figure 5:
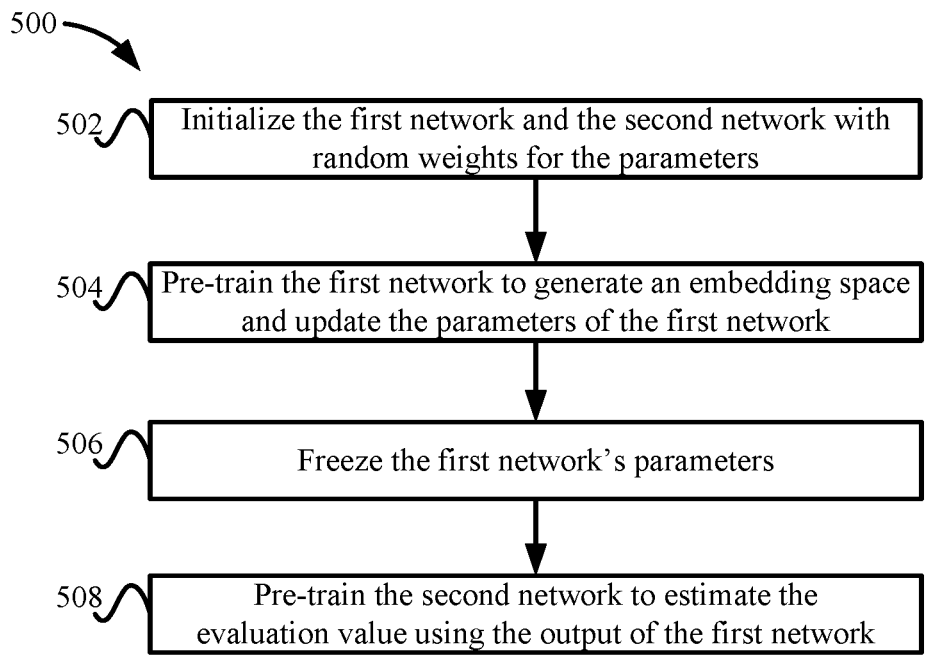
FIG. 5 depicts a simplified flowchart of a method for pre-training recommendation learning model 114 according to some embodiments.

FIG. 5 depicts a simplified flowchart 500 of a method for pre-training recommendation learning model 114 according to some embodiments. At 502, first network 206 and second network 212 are initialized with random weights. For example, the parameters used to generate the recommendation lists 110 or the evaluation score are randomized.

At 504, the first network is pre-trained to generate an embedding space and the parameters are updated in the first network. In some embodiments, the first network is pre-trained to generate a suitable embedding $E_A$. In one training method, the distance $L_2$ between embedding $E_A$ and other items embedding as a vector $V_L$ is calculated. Then, a function, such as a soft-max function, is used to convert vector $V_L$ into a probability distribution vector. The first network's parameters are then updated according to a loss function, such as a cross-entropy loss function. For example, a cost is minimized.

Then, at 506, the first network's parameters are frozen in order to train the second network. At 508, the second network is pre-trained to estimate the evaluation value using an output of the first network. For example, the second network has an input of the recommendation list 110 from the pre-trained first network along with user behavior. The second network outputs the evaluation value, which is compared to the expected evaluation value.

Conclusion

Accordingly, some embodiments allow recommendation lists 110 to be generated in a live environment. The recommendation lists 110 may also be refined to reflect the latest user behavior dynamically. The evaluation and update can be performed while the recommendation system is being used to provide recommendation lists 110 to the user. The recommendation system does not need to be brought offline to update the model. The use of the learning model may provide more relevant recommendation lists 110 when the video delivery service provides recommendation lists 110 frequently to the user. For example, the user may not be specifically performing searches but may be navigating to different aspects of a user interface in which a list of videos is generated to display in the interface. Different user behavior is constantly being received by the service as the user interacts with the recommendation lists 110. Applying this user behavior in real-time allows the system to adapt to the changing user preference quickly.

System

Figure 6:
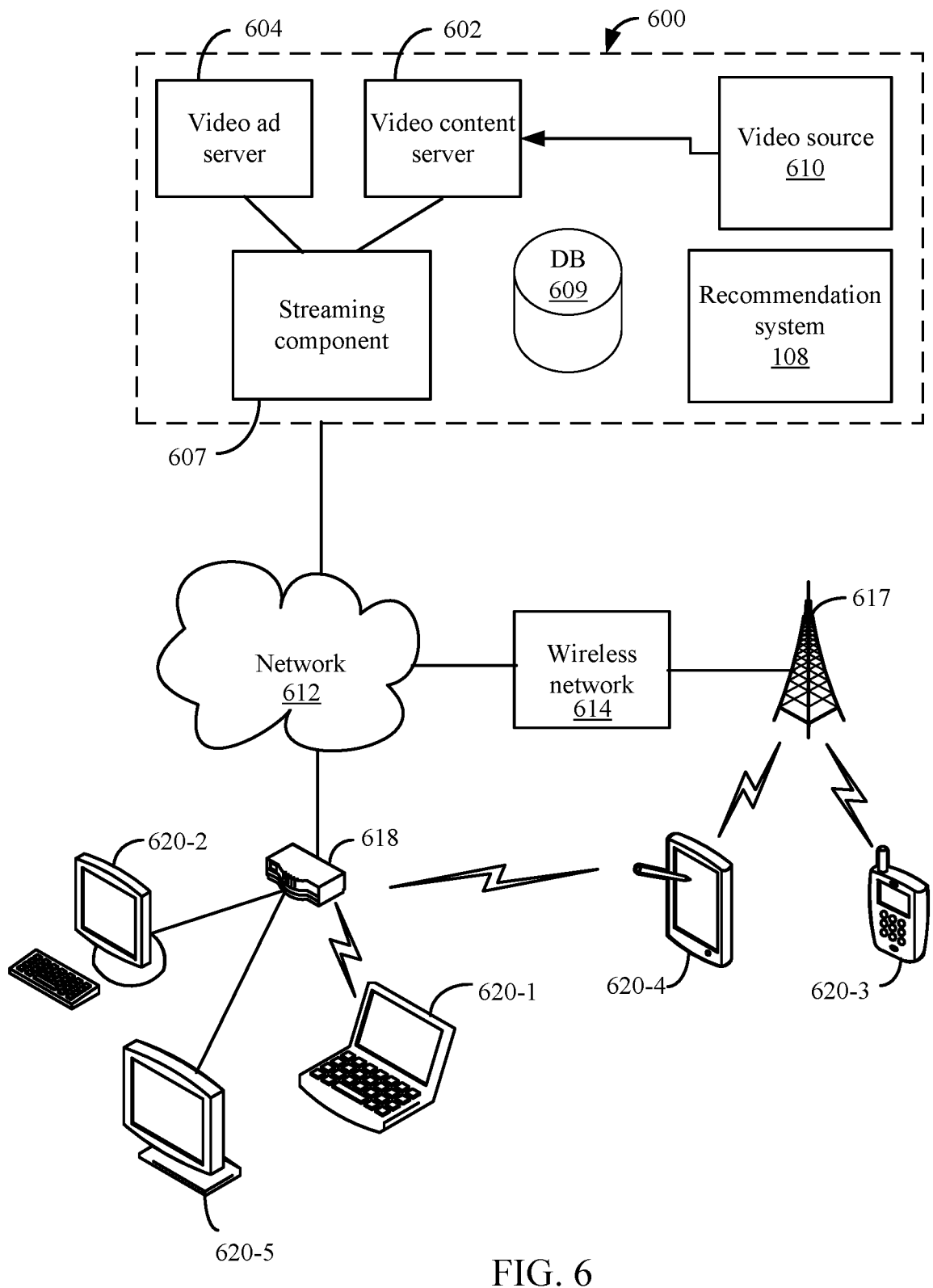
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include recommendation system 108.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612 and/or other network 614. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless telephony network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adapt to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
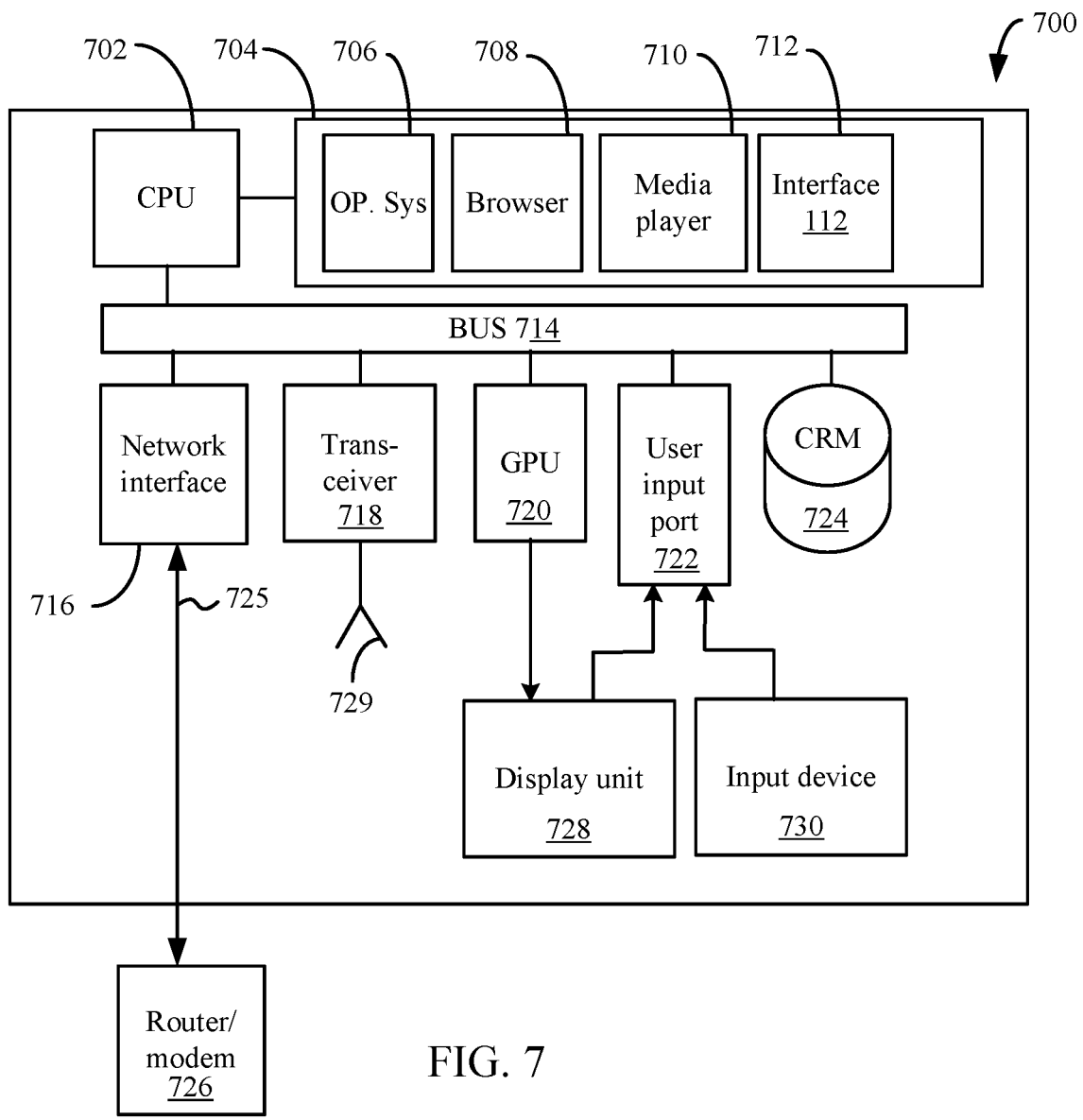
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include interface 112. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, user behavior information for a user at a first system, the user behavior information determined by user interaction with a first recommendation list sent to an interface being used by the user, wherein the first recommendation list is generated by a first network on a video delivery service;

generating, by the computing device, a first state using the received user behavior information and prior user behavior information by the user from a first set of cells that store the prior user behavior;

inputting, by the computing device, the first state into a second network with the first recommendation list from the first network to generate a value that evaluates a performance of recommending the first recommendation list;

generating, by the computing device, a first evaluation score for the first network, wherein first network parameters are updated based on the first evaluation score to generate a first update to the first network parameters;

generating, by the computing device, a second state using the received user behavior information and the prior user behavior information by the user from a second set of cells that store the prior user behavior; and outputting, by the computing device, a second recommendation list using the first network based on the first update to the first network parameters and the second state without being prompted by the user, wherein the second network uses the second recommendation list to generate a second evaluation score for the first network, wherein the first update of the first network parameters is updated based on the second evaluation score to generate a second update to the first network parameters during a live environment in which the first network is being used to provide recommendation lists to the interface.

2. The method of claim 1, further comprising:
providing the first recommendation list to the user on the interface for the video delivery service; and
receiving the user behavior information determined by user interaction with the first recommendation list on the interface.

3. The method of claim 2, wherein the user behavior information is determined by the user selecting a recommendation in the first recommendation list on the interface.

4. The method of claim 1, wherein outputting the second recommendation list using the first network comprises:
generating a first vector in a continuous embedding space; and
selecting N videos that have respective second vectors closest to the first vector.

5. The method of claim 4, wherein the first vector and the respective second vectors define characteristics for videos.

6. The method of claim 1, wherein the first set of cells and the second set of cells store sequential user behavior that is used to generate the first state and the second state, respectively.

7. The method of claim 1, further comprising:
sending the second recommendation list to the second network; and
inputting the second state into the second network with the second recommendation list from the first network to generate a second evaluation value that evaluates the performance of recommending the second recommendation list.

8. The method of claim 7, wherein the second recommendation list is not sent to the user.

9. The method of claim 7, wherein the second evaluation score is used to further update the first update to the first network parameters to generate a second update to the first network parameters.

10. The method of claim 9, further comprising:
inputting the second state into the first network to output a third recommendation list using the first network based on the second update to the first network parameters without being prompted by the user.

11. The method of claim 10, wherein the third recommendation list is not sent to the user.

12. The method of claim 10, further comprising:
continuing to evaluate recommendations output by the first network using the second network until a change to a gradient used to update the first network parameters is minimized.

13. A non-transitory computer-readable storage medium containing instructions, that when executed, control a computer system to be configured for:
receiving user behavior information for a user at a first system, the user behavior information determined by user interaction with a first recommendation list sent to an interface being used by the user, wherein the first recommendation list is generated by a first network on a video delivery service;
generating a first state using the received user behavior information and prior user behavior information by the user from a first set of cells that store the prior user behavior;

inputting the first state into a second network with the first recommendation list from the first network to generate a value that evaluates a performance of recommending the first recommendation list;
generating a first evaluation score for the first network, wherein first network parameters are updated based on the first evaluation score to generate a first update to the first network parameters;
generating a second state using the received user behavior information and the prior user behavior information by the user from a second set of cells that store the prior user behavior; and
outputting a second recommendation list using the first network based on the first update to the first network parameters and the second state without being prompted by the user, wherein the second network uses the second recommendation list to generate a second evaluation score for the first network, wherein the first update of the first network parameters is updated based on the second evaluation score to generate a second update to the first network parameters during a live environment in which the first network is being used to provide recommendation lists to the interface.

14. The non-transitory computer-readable storage medium of claim 13, further configured for:
providing the first recommendation list to the user on the interface for the video delivery service; and
receiving the user behavior information determined by user interaction with the first recommendation list on the interface.

15. The non-transitory computer-readable storage medium of claim 13, wherein outputting the second recommendation list using the first network comprises:
generating a first vector in a continuous embedding space; and
selecting N videos that have respective second vectors closest to the vector.

16. The non-transitory computer-readable storage medium of claim 13, further configured for:
sending the second recommendation list to the second network; and
inputting the second state into the second network with the second recommendation list from the first network to generate a second evaluation value that evaluates the performance of recommending the second recommendation list.

17. The non-transitory computer-readable storage medium of claim 16, wherein the second recommendation list is not sent to the user.

18. The non-transitory computer-readable storage medium of claim 16, wherein the second evaluation score is used to further update the first update to the first network parameters to generate a second update to the first network parameters.

19. The non-transitory computer-readable storage medium of claim 16, further configured for:
inputting the second state into the first network to output a third recommendation list using the first network based on the second update to the first network parameters without being prompted by the user.

20. An apparatus comprising:
one or more computer processors; and
a non-transitory computer-readable storage medium comprising instructions, that when executed, control the one or more computer processors to be configured for:
receiving user behavior information for a user at a first system, the user behavior information determined by user interaction with a first recommendation list sent to an interface being used by the user, wherein the first recommendation list is generated by a first network on a video delivery service;

generating a first state using the received user behavior information and prior user behavior information by the user from a first set of cells that store the prior user behavior;

inputting the first state into a second network with the first recommendation list from the first network to generate a value that evaluates a performance of recommending the first recommendation list;

generating a first evaluation score for the first network, wherein first network parameters are updated based on the first evaluation score to generate a first update to the first network parameters;

generating a second state using the received user behavior information and the prior user behavior information by the user from a second set of cells that store the prior user behavior; and outputting a second recommendation list using the first network based on the first update to the first network parameters and the second state without being prompted by the user, wherein the second network uses the second recommendation list to generate a second evaluation score for the first network, wherein the first update of the first network parameters is updated based on the second evaluation score to generate a second update to the first network parameters during a live environment in which the first network is being used to provide recommendation lists to the interface.

* * * * *